US009341826B2

(12) United States Patent
Fussy

(10) Patent No.: US 9,341,826 B2
(45) Date of Patent: May 17, 2016

(54) SPHERICAL LENS REDIRECTED IMAGING

(71) Applicant: Cisco Technology, Inc., San Jose, CA (US)

(72) Inventor: Thomas Fussy, Portola Valley, CA (US)

(73) Assignee: Cisco Technology, Inc., San Jose, CA (US)

(*) Notice: Subject to any disclaimer, the term of this patent is extended or adjusted under 35 U.S.C. 154(b) by 34 days.

(21) Appl. No.: 14/291,523

(22) Filed: May 30, 2014

(65) Prior Publication Data

US 2015/0346463 A1 Dec. 3, 2015

(51) Int. Cl.
*H04N 7/15* (2006.01)
*G02B 13/06* (2006.01)

(52) U.S. Cl.
CPC . *G02B 13/06* (2013.01); *H04N 7/15* (2013.01)

(58) Field of Classification Search
CPC ........... H04N 7/15; H04N 7/14; H04N 7/141; H04N 7/142; G03B 17/00; G03B 15/00
USPC ........................................... 348/14.01–14.16
See application file for complete search history.

(56) References Cited

U.S. PATENT DOCUMENTS

| 2009/0135478 | A1* | 5/2009 | Shen | 359/399 |
| 2012/0069232 | A1* | 3/2012 | Chui et al. | 348/333.01 |
| 2013/0126617 | A1* | 5/2013 | Olmstead | 235/462.25 |
| 2013/0328999 | A1* | 12/2013 | Roman | 348/14.08 |

OTHER PUBLICATIONS

Krishnan et al., Towards a Tree Spherical Camera, 2009, vol. 7240, Human Vision and Electronic Imaging XIV.
Nayar et al., Programmable Imaging Towards a Flexible Camera, Feb. 23, 2005, International Journal of Computer Vision.
Nayar, Computational Cameras: Approaches, Benefits and Limits, Jan. 15, 2011.
Nayar, Computational Cameras: Redefining the Image, 2006, IEEE Computer Society.
Total Internal Reflection, Modified Mar. 8, 2014, Wikipedia.com.
Understanding Ball Lenses, 2014, Edmund Optics.
Zhou et al., Computational Cameras: Convergence of Optics and Processing, Dec. 2011, vol. 20, No. 12, IEEE Transactions on Image Processing.

* cited by examiner

*Primary Examiner* — Melur Ramakrishnaiah
(74) *Attorney, Agent, or Firm* — Lempia Summerfield Katz LLC

(57) ABSTRACT

Wide angled image generation may be facilitated by directing light rays of a field of view through a partial spherical ball lens along an original axis. The light rays may be redirected off of a flat surface of the partial spherical ball lens along a different axis to at least one image sensor. The at least one image sensor is operable converts the light rays into digital data representing the redirected light rays. Wide angled images may be generated from the digital data.

20 Claims, 4 Drawing Sheets

SPHERICAL LENS REDIRECTED IMAGING

TECHNICAL FIELD

The following disclosure generally relates to wide angled image acquisition and, more particularly, to wide angled imaging with light rays redirected using a spherical or partial spherical lens.

BACKGROUND

A form of telepresence interaction involves video conferencing where a view of the parties is typically provided via video capture cameras relaying images of the parties to video screens of the remotely located counterparts to the conferencing session. Current video conferencing systems may involve multiple video capture devices to adequately display a desired field of view for a conference, particularly when the conference involves multiple participants at a location. For example, one location of a conference may involve multiple participants sitting at a conference table. These participants may be positioned such that two or more video capture devices may be required to adequately display a field of view that includes all of the participants. Each video capture device may involve a lens assembly and associated video capture components, thus multiplying the costs of equipment required for each device required. Further, multiple video capture devices may involve significant space to deploy.

BRIEF DESCRIPTION OF THE DRAWINGS

Exemplary embodiments of the present invention are described herein with reference to the following drawings.

DESCRIPTION OF EXAMPLE EMBODIMENTS

Overview

Figure 1:
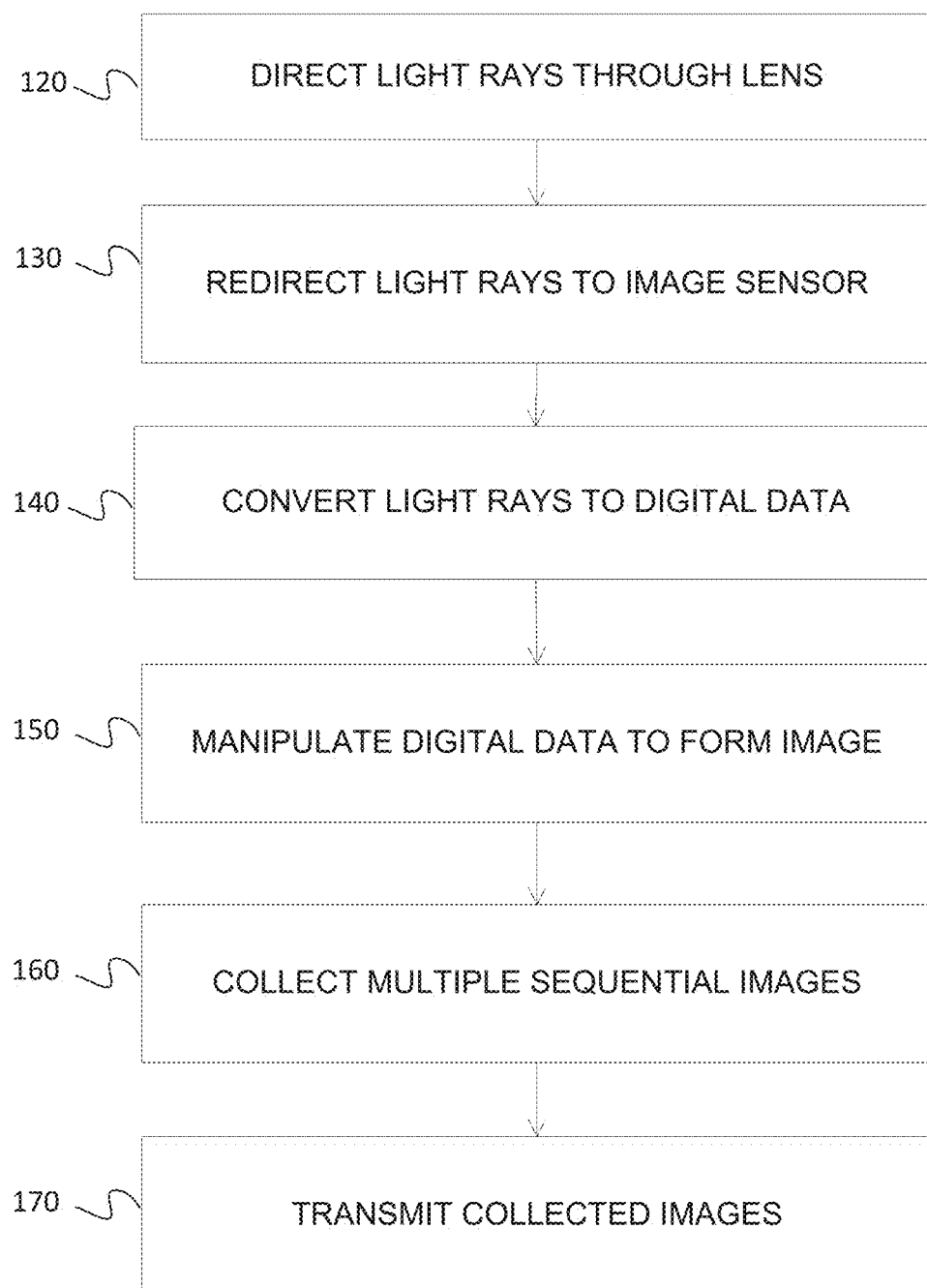
FIG. 1 illustrates an example flow chart diagram of a method for spherical lens redirected imaging.

In one embodiment, a system, such as a video conferencing or telepresence system, may involve a partial spherical ball lens having a flat surface from which light rays of a field of view are reflected along an axis. The system may also involve at least one image sensor disposed along the axis to receive the reflected light rays and configured to transform the light rays into digital data. The system may also involve at least one processor communicatively coupled to the image sensor and configured to produce an image representing the field of view using the digital data.

EXAMPLE EMBODIMENTS

Larger fields of view with fewer video capture devices may be provided by video capture devices implementing wide-angle lens assemblies. Specifically, an image capture device may be configured to involve a spherical lens oriented to provide an appropriate field of view. For example, the spherical lens may be deployed as the front objective lens in an image capture device. The spherical lens may be a partial spherical ball lens, such as a half-ball lens, having a flat surface from which light rays of a field of view are redirected along an alternate axis to an image sensor. Data representing the light rays generated by the image sensor may be used to produce an image representing the field of view. Further, multiple image sensors may be used to form an image sensor array to fully capture and digitize the field of view made available using the wide-angled partial spherical ball lens.

Particularly, spherical optics such as spherical ball lenses may provide a wide angled field of view for an image capture or acquisition device. Spherical ball lenses may be constructed of any optically conducive materials such as glass or various plastics, and involve a characteristic monocentricity allowing multiple image sensors to be focused on a single front objective lens without overlap of specific areas of a field of view captured by the image sensors.

In an embodiment, space along the primary axis for light rays of a field of view may be limited to implement a spherical ball lens image capture device. In such an embodiment, the spherical ball lens may be modified to redirect the light rays along an alternate axis having available space. For example, a telepresence or other video conferencing embodiment may involve the implementation of monitors or other image display devices along a wall of a room to provide minimal intrusion into the room space. Space separating the monitors and the wall may be very limited, however, monitor sizing may allow for significant space along a plane parallel to the wall behind or with the monitors. The spherical ball lens may be modified so as to be a half-sphere having a flat surface from which the light rays may be redirected such that the light rays may be collected and digitized using image sensors or other devices arranged in the parallel plane. Specifically, by turning the optical path of the light rays at an angle, such as a right angle, from the optical path's original direction, the primary axis length required for supporting structure and elements of an image capture device, such as relay lenses, will be redirected along the alternate axis. Thus, the length along the primary axis required for the lens assembly of the image capture device will be shortened. In this way, the image capture device is effectively folded 90 degrees or other angle. An embodiment involving a folded image capture device may be used in multiple applications where a low profile or thinness of a device is desirable. For example, mobile devices, such as mobile phones or personal digital assistants, may employ low profile folded image capture devices having partial spherical ball lenses.

The redirection of the light rays may be accomplished using various techniques. In an embodiment, the flat surface of the spherical ball lens may be coupled with a reflective substance, such as a reflective coating operational to redirect the light rays. In another embodiment, the flat surface may be oriented in the path of light rays such that the light rays from the field of view are totally reflected off of the surface internally without the coupling of a supplemental reflective substance. Such total internal reflection (TIR) may be achieved by controlling an angle of orientation of the flat surface of the partial spherical ball lens relative to the path of the light rays.

FIG. 1 is an example flowchart for an embodiment of partial spherical ball lens image acquisition. The acts of the flowchart may be performed in the order shown, or a different order. Additional, different, or fewer acts may be provided. For example, acts 160 or 170 are not performed. The acts 150, 160, and 170 of the embodiment may be implemented using computer program logic or computer readable program code stored in the memory and/or storage of a computer or system, such as the system 400 described below with respect to FIG. 4, and executable by one or more processors thereof to cause the system 400 to implement the disclosed functionality when coupled with the appropriate components, such as lenses and image sensors, as indicated further below.

In act 120, light rays may be directed through a lens. The directing may involve the placement or positioning of the lens so that light rays of a field of view propagate or travel through the lens. In an embodiment, the field of view may correspond to a field of view containing one or more participants in a video conference or other telepresence event.

Figure 2:
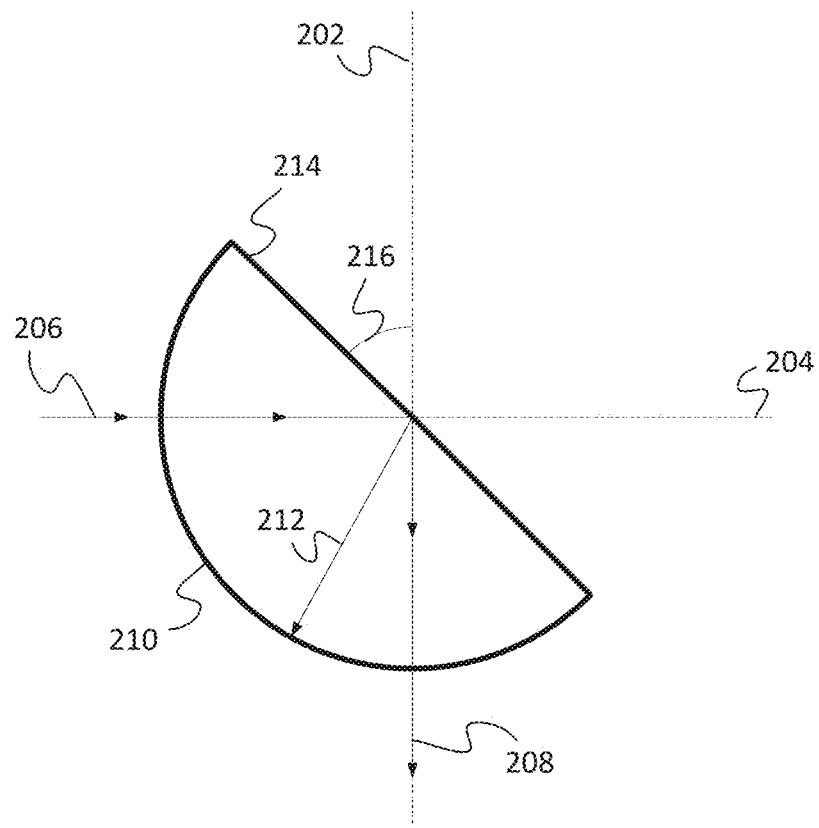
FIG. 2 illustrates an example of a partial spherical ball lens for use in spherical lens redirected imaging.

The lens may be a spherical ball lens or a partial spherical ball lens. As such, the external surface of the lens 210 may be homogeneous or constant so as to provide consistent spherical optical effects. The lens may be a partial spherical ball lens 210 as depicted in FIG. 2. The partial spherical ball lens may be a half-sphere lens or other shaped lens such as to form more or less than a half-sphere. The partial spherical ball lens may have a flat surface 214 oriented at some angle to a primary axis of travel 204 of a light ray 206 such that the flat surface 214 redirects the light ray 208 along a different axis 202. Further, the surface may be uniformly flat, or involve a varying flatness or curvature based on redirected qualities desired of the lens. The different axis 202 may be at any angle to the primary axis of travel 204. For example, the different axis 202 may form a 70 degree angle, 92 degree angle or 100 degree angle to the primary axis 204. In an embodiment, the angle is a right angle. The lens may also have a constant or variable surface radius 212, depending on desired optical effects of the lens. The flat surface 214 may be any length depending on a division of the partial spherical ball lens. For example, in an embodiment of a half-ball lens, the length of the flat surface may be twice the radius 212. In another embodiment involving less than a half-ball lens, the length of the flat surface 214 may be less than twice the radius 212. Also, in an embodiment, a partial spherical ball lens may involve multiple other surfaces so as to limit the lens to an optically useful slice of a spherical lens. As such, less lens material may be used if material is not included for areas of the lens not involved in manipulating the light rays 206, 208. The lens 210 may be constructed of any material suited for light conductivity. For example, glass or plastics such as polycarbonate or other polymers may be used. The lens may be clear or involve coloring depending on the specific implementation and desired optical effects In act 130, the light rays may be redirected along a different axis. Again referring to FIG. 2, the light rays may be redirected using a flat surface 214 of a partial spherical ball lens 210. In an embodiment, the partial spherical ball lens 210 may be a half-ball lens. Further, the flat surface 214 may redirect light rays using any technique. In an embodiment, the flat surface 214 is coupled with a reflective material. The reflective material may be an optical coating or reflective material otherwise adhered to, or coupled with, the flat surface 214. For example aluminum may be deposited on the flat surface 214 of the partial spherical ball lens 210. In another embodiment, a dielectric coating such as magnesium fluoride or calcium fluoride may be adhered to the flat surface 214.

In an embodiment, light rays of the field of view may be redirected without the coupling of a reflective material to the flat surface 214. In such an embodiment, the flat surface 214 may be positioned at an angle 216 relative to an axis 204 such that some of the light rays 206 entering the lens 210 are completely reflected off of the flat surface 214 internally to the lens 210. Such a technique is considered a total internal reflection (TIR) of light rays. TIR is an effect that occurs when a propagating wave strikes a medium boundary at an angle larger than a particular critical angle with respect to the normal to the surface. If a refractive index is lower on the other side of the boundary and the incident angle is greater than the critical angle, the wave cannot pass through and is entirely reflected. The critical angle is the angle of incidence above which total internal reflectance occurs. This may be an optical phenomenon, where light rays are involved, but it occurs with many types of waves, such as electromagnetic waves, or sound waves. Therefore, positioning the flat surface 214 appropriately with respect to light rays from the field of view may allow the lens 210 to take advantage of TIR in redirecting the light rays onto a different axis. In an embodiment, a combination of TIR positioning and reflective coatings may be used to redirect the light rays. In other embodiments, partial reflection rather than total reflection is used.

Figure 3A:
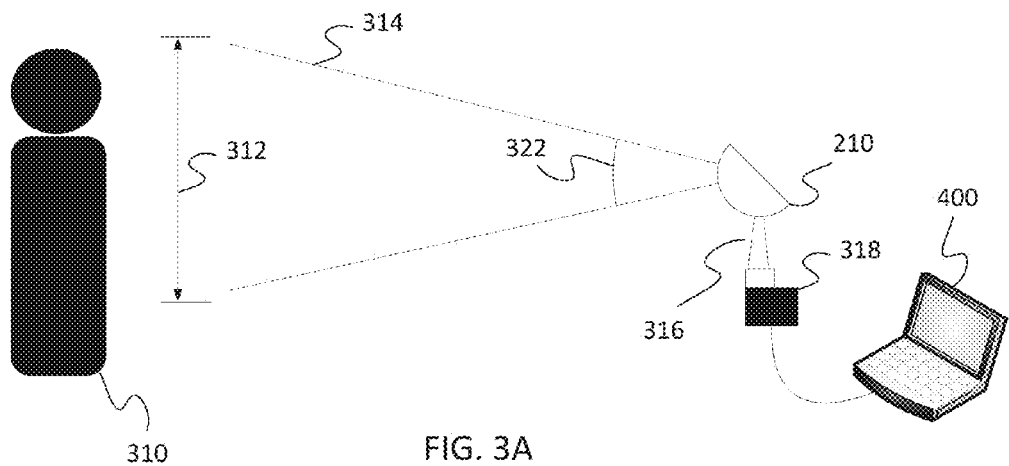
FIGS. 3A-3C illustrate embodiments of spherical lens redirected imaging.

The field of view may be any area or space positioned relative to the lens such that the light rays corresponding, or emanating from, the field of view will travel through or into the lens. A field of view 312 may be illustrated more fully with reference to FIGS. 3A and 3C. The field of view may be defined by a vertical angle 322 and a horizontal angle 324 relative to an origin at a point in the lens. For example, a wide angled field of view facilitated by the partial ball lens may involve a vertical angle 322 of 26 degrees and a horizontal angle 324 of 135 degrees. In an embodiment, the field of view 312 may be selected such that such that light rays 312 of participants 310 exist in the field of view and travel through the lens 210. The participants 310 may be participants in a video-conference or other telepresence event. A side view of the field of view 312, as is illustrated in FIG. 3A, indicates that the entirety of a participant 310 is not necessarily included in the field of view. Instead, a field of view 312 may be selected that appropriately or adequately represents the participants 310 for communicative purposes in a telepresence experience. FIG. 3C is an overhead view of the field of view 312, and illustrates the extended length available for a field of view 312 of a wide angle lens such as the partial spherical ball lens. Greater and/or lesser horizontal and/or vertical fields of view may be provided. In an embodiment, the field of view 312 may or may not encompass all of each participant or object of interest.

Further, there may be an image sensor 318 positioned along the different axis such that the light rays of the field of view 314 are redirected as the light rays travel through the lens 210 to the image sensor 318, as may be illustrated with reference to FIG. 3A. In act 140 of FIG. 1, the redirected light rays of the field of view 316 may be transformed into digital data using the image sensor 318. In an embodiment, the image sensor 318 may involve other components such as a baffle or other shielding for use in collecting, sensing, or otherwise interpreting light rays.

Figure 3B:
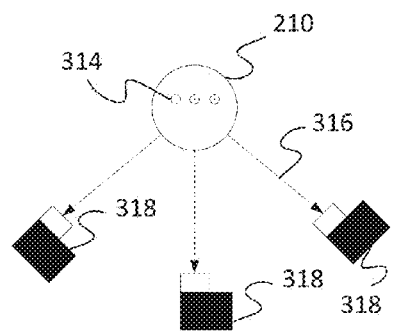
Figure 3C:
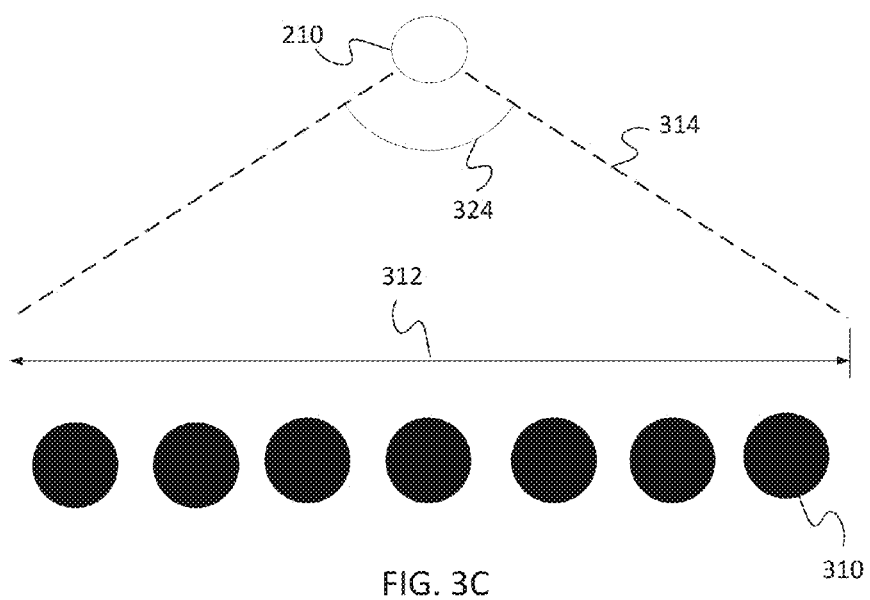

Further, as is illustrated with respect to FIG. 3B, multiple image sensors 318 may be positioned to receive the redirected light rays of the field of view 316. For example, the image sensors 318 may be collectively linked as an image sensor array, wherein the image sensors of the array are positioned to fully receive redirected light rays 318 of the entirety of the field of view 312 through the same lens 210. Again referencing FIG. 3C, a lengthened field of view 312 facilitates the representation of more participants 310 in a telepresence experience using fewer imaging devices and/or lens assemblies. An angle 322 corresponding to light rays 314 of a field of view may provide for a similar angle for the redirected light rays 316. As such, the closer an image sensor 318 is to the lens 210, the smaller the light ray accepting area of the sensor 318 will need to be. The number of sensors 318 in the array may be the same or different than the number of objects of interest. Multiple lenses 210 and corresponding sensors 318 or sensor arrays may be used. In an embodiment, each sensor 318, or sensor array, may involve an exclusive area of the field of view.

In an embodiment, the image sensor 318, or sensors 318, may be placed in close proximity to the lens 210. As indicated above, the light ray accepting area of the sensor 318 may be smaller the closer the image sensor 318 is to the lens 218. In an embodiment, the image sensor 318 is placed as closely as possible to the lens 210. For example, the image sensor 318, or an image capture device incorporating the image sensor 318, may be positioned so as to be abutting or otherwise in contact with the lens 210. This orientation may serve to minimize the space and/or amount of image sensor area required to position image sensors 318 to adequately collect light rays corresponding to an entire field of view.

The image sensor 318 may be any device operable to convert the light rays to digital data. For example, semiconductor charge-coupled devices (CCD), active pixel sensors in complementary metal-oxide-semiconductor (CMOS), N-type metal-oxide-semiconductor (NMOS), or other types of photo sensor or photo sensor array devices may be used. Further, the digital conversion may be accomplished using any digitizing technique.

In act 150, the digital data is manipulated to form an image of the field of view. For example, again referring to FIG. 3A, the digital data may be transmitted or otherwise transferred from the photo sensor 318 to a system 400 as described more fully below with respect to FIG. 4. The system 400 may operate to manipulate data representing particular locations of the field of view as received by the image sensors so as to generate a clear and appropriately oriented image of the field of view. In an embodiment, the photo sensor 318 may be a component of an image or video capture device, such as a digital camera coupled or otherwise in communication with the system 400. In an embodiment, separate sensors 318 or cameras capture exclusive areas of the field of view. The exclusive areas may be assembled into a single larger field of view image, or may be maintained as exclusive and independent images relating to the exclusive areas of the field of view. The sensor positions may be selected so as to create abutting exclusive areas so as to more fully represent the field of view. By being at different positions on the lens, the sensors receive light rays from different areas of the field of view (e.g., different angles of incidence relative to the lens). In an embodiment, the field of view may involve participants in a video conference or other telepresence event. As such, the field of view may be considered a video conferencing or telepresence field of view, and a resulting image may be considered a video conferencing or telepresence image.

In an embodiment involving a spherical ball lens, or a partial spherical ball lens, blurring or other distorted visual effects may result from passing the light rays through the lens. These effects are a significant reason why spherical ball lenses are not used in traditional non-digital photography. However, with the assistance of computational devices such as the system 400 of FIG. 4, light rays received at an image sensor may be geometrically correlated to an origin position in the field of view based on the curvature of the spherical lens. Individual pixels representing the origin positions may be generated as digital data describing the origin position using the image sensors. As the geometrical variations of the light rays due to the spherical lens type may be calculated based on lens geometry, the pixels may be specifically assembled into a picture using the system 400 so as to remove the blurring or other distortive effects caused by the spherical ball lens, but maintain the wide angle and monocentric optical benefits of the lens type. Further, translation, inversion, or rotation of an assembled image may be performed digitally using a computational device, without the involvement of additional optical devices or lenses designed to account for these effects. Such computational photography may result in deblurred and appropriately oriented images where it was previously not possible.

Figure 4:
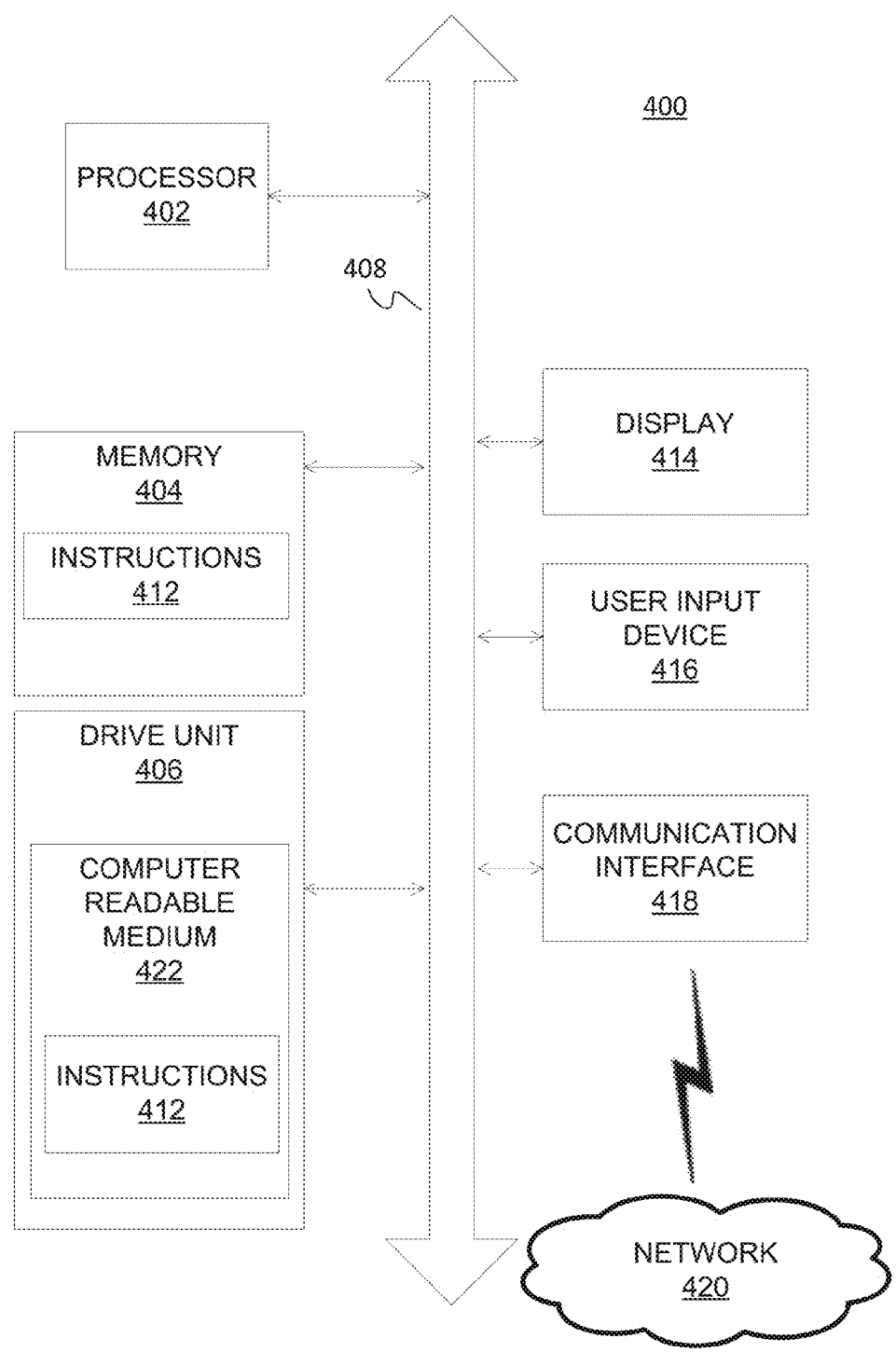
FIG. 4 depicts a system for spherical lens redirected imaging.

Acts 120, 130, 140, and 150 may be repeated such that multiple sequential images are collected or otherwise accumulated in act 160. The images may be stored on a memory such as the memory 404 of the system 400 as shown in FIG. 4. The multiple images may be assembled using the processor 402 into a video sequence depicting the field of view over time. Further, the video sequence may be constructed or otherwise assembled in real-time so as to accurately represent activity within the field of view as it is occurring. The images may be assembled into video of any format or technique of digital video encoding may be used, for example, MPEG formats, H.265 formats, VC-1 formats or H.261 formats may be used. In an embodiment, videos relating to exclusive areas of a field of view may be generated. The videos may be assembled into a singular composite video representing a field of view, be maintained as separate videos for presentation, or both.

In act 170, images may be transmitted. The images may be transmitted to a recipient that is located remotely from the field of view. For example, the images may be of one or more fields of view including participants in a telepresence event, and the images may be transmitted to other participants of the telepresence event that are not located in the field of view. The images may be transmitted using the communication interface 418 of the system 400 of FIG. 4 via the network 420. The images may be transmitted as video or a video stream, wherein the video may be displayed on a display 414 using a system 400 at the remote location. Further, the video may be displayed in real-time so as to represent the activities occurring within the field of view as they happen so.

In an embodiment, a telepresence system involves a system 400 coupled with an image capture device implementing a partial spherical ball lens. The telepresence system is located at a specific location, such as a conference room in Chicago, Ill. A similar telepresence system may be located in San Jose, Calif. The systems may be in communication via the network 420. Participants of a telepresence event may be present in each location and exist within a field of view at each location. The systems may generate video of each of the fields of view in real-time and transmit the video to the opposite system so as to display the videos in real-time to the telepresence event participants.

A telepresence camera implementing a partial spherical ball lens may be positioned in a room such that the primary bulk of the camera may be positioned co-planer or parallel with a display or group of displays along an edge of a room (e.g., co-planar with a wall or display). In this way, the camera may receive rays of light along a primary axis corresponding to a field of view for the telepresence device, but not protrude into the room other than the curvature of the lens. Such a camera may be implemented in a manner so as to minimize the camera's appearance or detectability during a video conference or other telepresence event.

FIG. 4 provides an illustrative embodiment of a general computer system 400 that may be used in telepresence systems. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the embodiments discussed above may be implemented using the computer system 400, multiple computer systems 400, or a component in the computer system 400.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication, such as network communications using a real-time protocol (RTP) for video, audio, and/or other content. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed). In an embodiment, the processor 402 may be configured to manipulate digital data into an image.

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc (CD), digital versatile disc (DVD), memory card, memory stick, floppy disc, universal serial bus (USB) memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like. In an embodiment, the memory 404 may be configured to store images or video of a field of view.

The computer system 400 may also communicate with an image capture device such as a digital camera operational to encode digital images and/or videos from light rays using image sensors and lens assemblies. In an embodiment, the image capture device implements a partial spherical ball lens in a lens assembly. Further, the partial spherical ball lens may be implemented as a front objective lens through which light rays of a field of view travel. The light rays may also be redirected from a flat surface of the partial spherical ball lens along an alternate axis to the image sensor, or sensor, of the image capture device. The image sensor may then be used to convert the light rays of the field of view into digital data representative of the field of view. The digital data may be used to generate an image of the field of view. In an embodiment, the digital data is processed by the processor 402 to generate the image. In an embodiment, the image capture device includes a processor to process the digital data into an image. Further, an image capture device processor may be used along with other processors of the computer system 400 to generate an image of the field of view.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406. In an embodiment, the display 414 may be operational to display images or video. The images or video may be of participants in a telepresence event. The display unit 414 may include a single display or an array of separate displays.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400. The input device 416 may be operational to facilitate the interaction of a participant to refine the field of view for image collection. In an embodiment, the image collection may be a collection of images of a telepresence event.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

In an embodiment, the system 400 may be operable to transmit and receive video of fields of view of a telepresence event vie the network 420 to other systems configured to receive and transmit similar video.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, or a digital camera to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

I claim:

1. A method comprising:
   directing light rays of a field of view through a partial spherical ball portion of a lens along an original axis;
   redirecting the light rays off of a flat surface of the lens along a different axis to at least one image sensor, wherein the at least one image sensor converts the light rays into digital data representing the redirected light rays; and
   producing, by a processor, a video conference image of the field of view from the digital data.

2. The method of claim 1, further comprising:
   deblurring the digital data to compensate for a spherical nature of the lens, and wherein producing an image comprises producing an image from the deblurred digital data.

3. The method of claim 1, wherein the flat surface of the lens comprises a reflective coating.

4. The method of claim 1, wherein the flat surface of the lens is oriented such that the light rays directed along the original axis redirect off of the flat surface in total internal reflection (TIR) along the different axis.

5. The method of claim 1, wherein a plurality of images are produced in sequence, and wherein the method further comprises:
   generating video representative of the field of view out of the plurality of images.

6. The method of claim 5, further comprising:
   transmitting the video in real-time to a display device located remotely from the field of view.

7. The method of claim 1, wherein the at least one image sensor comprises a plurality of image sensors.

8. The method of claim 1, wherein the at least one image sensor contacts a surface of the lens.

9. The method of claim 1, wherein the original axis is oriented at a right angle to the different axis.

10. A device comprising:
    a lens including a partial spherical ball in which light rays of a field of view are directed through and a flat surface from which the light rays are reflected along an axis;
    at least one image sensor disposed along the axis to receive the reflected light rays and configured to transform the light rays into digital data; and
    at least one processor communicatively coupled to the image sensor and configured to produce a video conference image representing the field of view using the digital data.

11. The device of claim 10, wherein the at least one processor is further configured to deblur the digital data to compensate for a spherical nature of the lens, and produce an image using the deblurred digital data.

12. The device of claim 10, wherein the flat surface of the lens comprises a reflective coating.

13. The device of claim 10, wherein the flat surface of the lens is oriented such that the light rays directed along the original axis redirect off of the flat surface in total internal reflection (TIR) along the different axis.

14. The device of claim 13, wherein the at least one processor is further configured to transmit the video in real-time to a display device located remotely from the field of view.

15. The device of claim 10, wherein the at least one processor is further configured to generate video representative of the field of view.

16. The device of claim 10, wherein the flat surface of the lens extends to the circumference of the partial spherical ball.

17. A system comprising:
    a telepresence camera comprising a front objective lens shaped as having a half spherical ball portion in which light rays of a field of view are directed through and a flat surface from which the light rays are reflected along an axis, and at least one image sensor disposed along the axis to receive the reflected light rays and configured to transform the light rays into digital data; and
    at least one processor communicatively coupled to the image sensor and configured to produce an image of a telepresence participant in the field of view using the digital data.

18. The system of claim 17, wherein the flat surface of the lens is coupled with a reflective material.

19. The system of claim 17, wherein the flat surface of the lens is disposed such that the light rays directed along the original axis redirect off of the flat surface in total internal reflection (TIR) along the different axis.

20. The system of claim 17, wherein the system further comprises a display operable to display video of the field of view generated from the digital data, and is in communication with at least one remotely located system such that the combination is configured to operate as a telepresence system.

* * * * *